April 15, 1924.
C. R. JOHNSTON
COLLAPSIBLE BRAKE SUPPORT
Filed Feb. 21, 1923
1,490,744
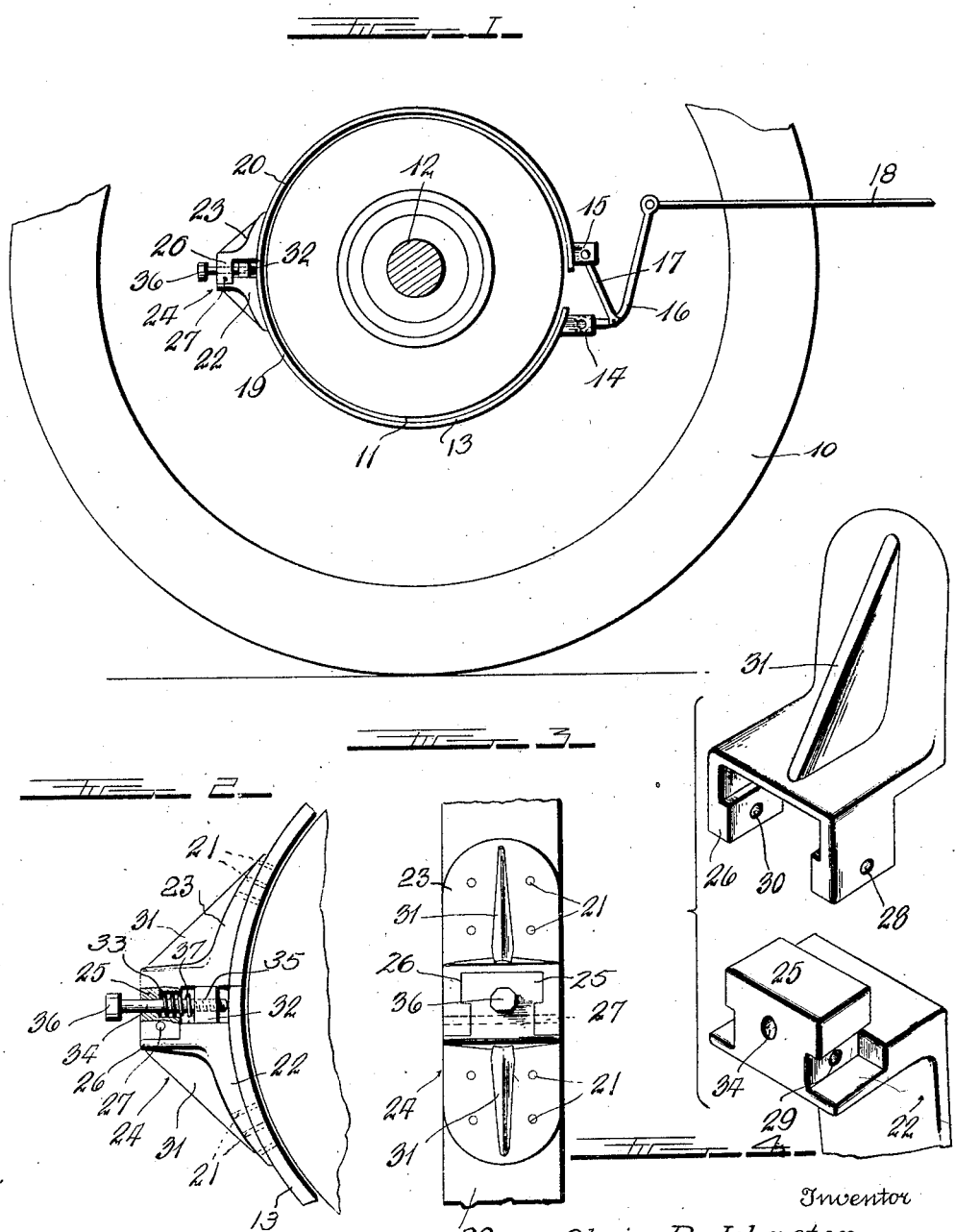

Patented Apr. 15, 1924.

1,490,744

UNITED STATES PATENT OFFICE.

CLAIR R. JOHNSTON, OF DUBOIS, PENNSYLVANIA.

COLLAPSIBLE BRAKE SUPPORT.

Application filed February 21, 1923. Serial No. 620,445.

*To all whom it may concern:*

Be it known that I, CLAIR R. JOHNSTON, a citizen of the United States, residing at Dubois, in the county of Clearfield and State of Pennsylvania, have invented certain new and useful Improvements in Collapsible Brake Supports, of which the following is a specification.

The invention relates to a support for the usual brake band of an automobile or the like, and more particularly to a two part brake support, the two elements of which are adapted to be collapsed or telescoped one over the other and secured together as one when the brake band and support are mounted upon the vehicle wheel, but which may be separated when it is desired to remove the brake band for the purpose of relining the same.

The object of the invention is to facilitate relining the brake band and to reduce the time required for this operation.

To this end it is proposed to cut the brake band of the usual type in two, each half of the band being secured to one of the elements of the brake support in any suitable manner. To remove the brake band it is only necessary to separate the elements of the support, each element carrying with it one half of the brake band. The brake band may then be relined in less than half the time required with the present construction of brake support and brake band.

These improvements will be more readily understood by reference to the accompanying drawings in which are shown an illustrative embodiment of the invention.

In the drawings:

Figure 1 is a fragmentary side view of a vehicle wheel which is provided with the improved brake support, Fig. 2 is a detail side view on an enlarged scale showing the brake support and a portion of the brake band, Fig. 3 is a rear view of the same, Fig. 4 is a detail perspective view showing the two collapsible elements of which the support is composed.

Referring particularly to Fig. 1, the reference numeral 10 denotes a portion of rim of a vehicle wheel, 11 is the brake drum, 12 the axle and 13 the brake band.

Any known means for clamping the brake band to the drum may be employed. As shown the ends of the band are provided with ears 14, 15, to which are pivoted the brake members 16 and 17 respectively. The member 17 is pivoted at its other end to the bell crank member 16. To the upper end of the member 16 is attached a brake rod 18.

The features so far described are well known in the art, and may be varied as desired. According to the present invention the brake band 13 is made in two parts 19, 20, each part being secured in any suitable manner as by means of rivets 21 to one of two collapsible elements 22, 23, respectively, of the brake support 24.

As shown the two elements 22, 23, are formed with coacting dovetailed portions 25, 26, which are adapted to telescope one with the other, the upper member fitting over the lower. When in this position the two elements may be secured together by means of a pin 27, passed through aligned apertures 28, 29, and 30, formed in the dovetailed portions.

Preferably, also, each element of the support is provided with a rib 31 which adds rigidity to the structure.

The brake support may be secured to a fixed portion of the vehicle frame in any suitable and well known manner. As shown the assembled support denoted generally by the numeral 24 is fitted over a fixed squared post 32, the brake support being provided with a squared slot 33 which is formed by suitably shaping the elements 22, 23. One of the elements as 22 is provided with an aperture 34 extending there-through in alignment with a corresponding aperture 35 in the squared post 32. Through these apertures there is passed an adjusting screw 36 by means of which the tightness of the brake band upon the brake drum may be regulated. A coil spring 37 may be employed, one end bearing against the post 32 and the other against the brake support. The adjusting screw 36 passes through the spring, as shown in Fig. 2. Both the adjusting screw and spring are well known in the art and no claim is laid to these features. Furthermore it is to be understood that any other means of securing the support to a fixed member of the vehicle may be employed, the means herein described being employed for the purpose of illustration only.

The novel brake support may be used with the usual form of brake band which may be found in any car. To instal the new form of support it is only necessary to cut off the old support, drill holes in the new support members to match the band and rivet them to the brake band. The brake band should then be cut in two even with the edge of the upper member, as shown in Fig. 2.

After the new support is once installed, in order to reline the brake, the brake support elements are separated, first removing the pin or bolt 27 which holds the parts in assembled position. The upper half of the support and with it the upper half of the brake band may then be removed, after which the adjusting screw 36, which holds the lower half, may be removed and the lower half of the support and lining may be removed.

It is, of course, first necessary to remove the parts of the brake operating mechanism from the ears 14, 15, at the ends of the brake band before the brake support is taken off.

It will be readily apparent that when a device of this character is used a brake band may be relined in a fraction of the time generally necessary to perform this operation, where the wheel must first be removed.

A great saving in time, labor and patience is thus effected.

Various changes in details of construction may be made without departing from the spirit of the invention which is to be limited only by the claims.

What I claim is:

1. A collapsible support for brake bands of motor vehicles, comprising a pair of telescopic elements adapted to be secured to upper and lower halves of the brake band.

2. In combination with a two part brake band, a collapsible brake support therefor comprising a pair of telescopic elements adapted to be secured to each of the parts of the brake band.

3. A support for a two part brake band, comprising two elements having coacting dovetailed portions which are adapted to telescope one with the other, the upper member fitting within the lower, the elements of said support being secured one to each portion of the brake band, and a pin for holding the telescoping elements in assembled position, said pin passing through aligned apertures formed in the dovetailed portions of the two said elements of the brakeband support.

4. In combination with a two part brake band, a brake support therefor comprising a pair of elements, one secured to each portion of the brake band, means for holding the parts of said support in assembled position, and a fixed post over which said assembled support is fitted.

In testimony whereof I affix my signature.

CLAIR R. JOHNSTON.